(12) United States Patent
Kyte et al.

(10) Patent No.: US 7,241,828 B2
(45) Date of Patent: Jul. 10, 2007

(54) TEXTURED GROUT COMPOSITION, DISPENSER THEREFOR, AND METHOD OF USE

(75) Inventors: William J. Kyte, Kansas City, MO (US); Richard F. Tripodi, Naperville, IL (US); Robert Ambroffi, Jr., Plainfield, IL (US)

(73) Assignee: H.B. Fuller & Co., St. Paul, MN (US)

( * ) Notice: Subject to any disclaimer, the term of this patent is extended or adjusted under 35 U.S.C. 154(b) by 0 days.

(21) Appl. No.: 10/669,991

(22) Filed: Sep. 24, 2003

(65) Prior Publication Data

US 2005/0065256 A1    Mar. 24, 2005

(51) Int. Cl.
C08K 3/26    (2006.01)

(52) U.S. Cl. .............. 524/425; 524/423; 524/426; 524/427; 524/430; 524/431; 524/432; 524/433; 524/437; 524/445; 524/446; 524/447; 524/448; 524/449; 524/450; 524/451; 524/456

(58) Field of Classification Search ........ 524/425–427, 524/423, 430–433, 437, 445–451, 456; 222/96, 222/635, 258; 424/423
See application file for complete search history.

(56) References Cited

U.S. PATENT DOCUMENTS

| | | | |
|---|---|---|---|
| 2,895,325 A * | 7/1959 | Dassetto | 425/87 |
| 3,705,669 A | 12/1972 | Cox et al. | |
| 3,785,568 A * | 1/1974 | Pfingsten et al. | 239/310 |
| 3,854,267 A | 12/1974 | Weiant et al. | |
| 3,859,233 A | 1/1975 | Barker | |
| 3,940,358 A | 2/1976 | Bernett et al. | |
| 4,055,529 A | 10/1977 | Burley | |
| 4,230,356 A | 10/1980 | O'Connor | |
| 4,381,066 A | 4/1983 | Page et al. | |
| 4,415,099 A | 11/1983 | Paris | |
| 4,472,540 A | 9/1984 | Barker | |
| 4,519,174 A | 5/1985 | Witt | |
| 4,758,295 A | 7/1988 | Sawaide et al. | |
| 4,833,178 A | 5/1989 | Schaefer et al. | |
| 5,011,713 A | 4/1991 | Lenti et al. | |
| 5,505,344 A | 4/1996 | Woods | |
| 5,524,798 A * | 6/1996 | Stern et al. | 222/402.1 |
| 6,037,429 A | 3/2000 | Linert et al. | |
| 6,103,360 A * | 8/2000 | Caldwell et al. | 428/323 |
| 6,251,984 B1 | 6/2001 | Shimada et al. | |
| 6,271,289 B1 | 8/2001 | Longoria et al. | |
| 6,284,077 B1 | 9/2001 | Lucas et al. | |
| 6,291,536 B1 * | 9/2001 | Taylor | 521/72 |
| 6,309,493 B1 | 10/2001 | Braun et al. | |
| 6,333,365 B1 | 12/2001 | Lucas et al. | |
| 6,395,794 B2 | 5/2002 | Lucas et al. | |
| 6,414,044 B2 | 7/2002 | Taylor | |
| 6,478,561 B2 | 11/2002 | Braun et al. | |
| 6,545,068 B1 | 4/2003 | Simmons et al. | |
| 6,596,074 B2 | 7/2003 | Pomeroy | |
| 2003/0029132 A1 | 2/2003 | Ward | |
| 2003/0129419 A1 | 7/2003 | Chen | |

OTHER PUBLICATIONS www.herc.org/library/msds/scotchgard3.htm—3M General Offices—*Scotchgard™ Brand Protector for Fabrics*—Internet printout—Aug. 13, 2003—4 pages.
www.mineral.galleries.com/minerals/carbonat/calcite/calcite.htm—*The Mineral Calcite*—Internet printout—Aug. 13, 2003—4 pages.
www.products3.3m.com/catalog/ca/en001/home_leisure/-/node_03FSoLSTR7gs/root_GS . . . —3M Canada—*Scotchgard™ Heavy Duty Water Repellent, For Outdoor*—Internet printout—Aug. 13, 2003—9 pages.
3M—*3M Material Safety Data Sheet Scotchgard™ Carpet and Upholstery Protector Concentrate*—Feb. 25, 2003—6 pages.
www.products3.3m.com/catalog/ca/en001/home_leisure/-/node_L67MJVKX2Qqs/root_GS . . . —3M Canada—*Scotchgard™ Cleaner for Fabric & Upholstery*—Aug. 13, 2003—7 pages.
www.realgar.mcli.dist.maricopa.edu/aaim/linear/L1.html—*Tools for Testing Hardness*—Internet printout—Aug. 13, 2003—1 page.
www.mineral.galleries.com/minerals/hardness.htm—*What is Important About Hardness*—Internet printout—Aug. 13, 2003—4 pages.
www.wovenwire.com/reference/particle-size-print.htm—*STG Particle Size/Screen Mesh Comparison*—Internet printout—Aug. 13, 2003—2 pages.
www.rohmhaas.com/rhcis/markets_and _products/floorcareproducts.html—Rohm and Haas—*Floor Care Polymers Trade Names*—Internet printout—Aug. 13, 2003—2 pages.
Rohm and Haas Company—*Rhoplex I-98 Rhoplex I-62 Colloidal Dispersions*—Oct. 2002—2 pages.
*Evaluating Screening Performance*—A.J. DeCenso—Rotex Inc., 1997 Powder & Solids Annual—5 pages.
www.fluorochemsilanes.co.uk/silane%20modified%20polymers.htm—Fluorochem—*Silane-Modified Polymers*—Internet printout—Sep. 15, 2003—2 pages.
www.specialchem4polymers.com/tc/organic-colorants/index.aspx?id=5002—SpecialChem—*Organic Colorants Center*—Internet printout Sep. 15, 2003—2 pages.

* cited by examiner

Primary Examiner—Peter Szekely
(74) Attorney, Agent, or Firm—Duane Morris LLP

(57) ABSTRACT

The invention relates to grout compositions that are suitable for packaging in pressurized containers. The compositions comprise a mineral filler that has average particle size greater than about 160 micrometers in which the mineral particles exhibit a Mohs hardness less than about 6.5.

39 Claims, 7 Drawing Sheets

TEXTURED GROUT COMPOSITION, DISPENSER THEREFOR, AND METHOD OF USE

BACKGROUND OF THE INVENTION

The invention relates generally to apparatus and compositions useful for grouting tiles and other building materials having interstices therebetween.

The placement of various flat or curved pieces of ceramic, stone, concrete, or other material, collectively referred to as "tile", onto floors, walls, counter tops, or other surfaces in a building is an ancient tradition. Tile is installed by adhering multiple tiles to the area to be covered and thereafter filling the spaces between the tiles with a grout.

In laying the tile on a floor, for example, the craftsman applies an adhesive (e.g., thin set mortar) to the floor. Then, tiles are positioned on the adhesive while inserting spacers between the tile for proper spacing, and the adhesive is allowed to set (e.g., overnight). Once set, the tile spacers are removed and a grout is applied to fill the spaces around the tile that have been preserved by the tile spacers. Grout often consists of a cementitious mixture of fine aggregates mixed into a cementing agent with a solvent (e.g., water), but made so thin as to flow almost like cream. The cementing agent may comprise a polymeric adhesive material (e.g., a resin-based grout, such as an epoxy) or simply Portland cement. The aggregates are typically sand and/or crushed stone. The addition of dyes and pigments to the cementitious materials has also enjoyed wide application in all of the above mentioned materials. Such grouts enjoy broad application in construction materials, tile setting, wall and pool plasters, stucco, self-leveling compounds, roofing tiles, and patches.

Application of grout to a tile surface such as a tile floor or wall has traditionally and conventionally been done almost entirely by hand in that the workman uses a hand trowel working on hands and knees or squatting in small areas by pouring the grout between the tiles and by hand troweling the excess grout to form the grouting joints while removing the excess to leave a smooth grouting joint between adjacent tiles.

Cementitious grouts are in common use. Polymeric resin-based grouts are also known. By way of example, U.S. Pat. No. 4,833,178 describes an epoxy resin-based grout composition that requires addition of a hardener thereto and mixing prior to use. U.S. Pat. Nos. 3,854,267; 3,859,233; and 4,472,540 describe non-epoxy polymer resin-based grout compositions that either contain sand or have a smooth-textured finish that is undesirable in many applications.

The present invention overcomes and eliminates the necessity for applying grout with hand trowels while greatly increasing the speed of application without reducing the workmanship or structural integrity of the grouting joints and which quickly and expeditiously allows for the application of the grout.

BRIEF SUMMARY OF THE INVENTION

The invention relates to a grout composition comprising a first mineral filler, a second mineral filler, and an air-dryable polymeric resin. The first mineral filler has an average particle size greater than 160 micrometers and a Mohs hardness less than about 6.5. The second mineral filler has an average particle size less than 600 micrometers. The composition comprises the air-dryable polymeric resin in an amount sufficient to bind the first and second mineral fillers upon drying of the composition.

One example of this grout composition comprises 20% to 40%, by weight, of first mineral filler particles having an average particle size in the range from 160 to 700 micrometers and a Mohs hardness less than about 6.5; 20% to 40%, by weight, of second mineral filler particles having an average particle size in the range from 90 to 120 micrometers; and 20% to 35%, by weight, of an air-dryable polymeric resin.

The first and second mineral fillers can be the same mineral (e.g., calcium carbonate) or different minerals. The overall mineral filler content of the grout composition (i.e., the sum of the first and second mineral fillers and any other mineral fillers incorporated into the composition) should be in the range from 30% to 80% by weight, and is preferably 55% to 65% by weight. The proportions of first and second mineral fillers can vary. The first mineral filler can be present in an amount from 5% to 70% by weight, but is preferably present in an amount from 20% to 40% by weight. The second mineral filler can be present in an amount from 5% to 60% by weight, but is preferably present in an amount from 20% to 40% by weight.

The grout composition described herein can be packaged in pressurized containers from which the composition can be dispensed. Preferably, compositions packaged in pressurized containers do not comprise a particulate having an average particle size greater than 100 micrometers and a Mohs hardness greater than about 6.5. More preferably, they do not comprise a particulate having an average particle size greater than 20 micrometers and a Mohs hardness greater than about 6.5.

Because the first mineral filler particles are generally larger than the second mineral filler particles, the hardness of the first mineral particles is more critical than the hardness of the second mineral filler particles. Suitable first mineral filler particles have sizes in the range from 160 to 700 micrometers, more preferably from 185 to 245 micrometers. The Mohs hardness of the first mineral filler should not be greater than about 6, and is preferably from 2 to 4. Suitable second mineral filler particles have sizes in the range from 50 to 600 micrometers, more preferably from 90 to 120 micrometers.

The polymeric resin in the grout composition can comprise a single polymer or a plurality of polymers, such as one or more acrylic latex polymers. Examples of suitable acrylic latex polymers include homopolymers of acrylate, homopolymers of alphamethyl acrylate, and copolymers of acrylate and alpha-methyl acrylate. In addition to any solvent in the polymeric resin, the grout composition can further comprise one or more additional solvents. Solvents can be added in an amount sufficient to improve the workability of the composition. For example, the viscosity of the grout composition can be adjusted such that it is not less than about 24000 centipoise (and preferably not more than about 88000 centipoise).

The grout composition can comprise other ingredients as well, such as a dye, a colorant (e.g., titanium dioxide), an antifoam, a wetting agent, a coupling agent, a biocide, a thickening agent, a drying rate modulator, a water-repelling polymer, and mixtures of these.

The invention also relates to a sealed container containing the grout composition described herein. The container has a nozzle for dispensing the composition from the container under pressure. The container can have a valve in fluid communication with the nozzle. The composition is dispensed through the nozzle upon actuation of the valve. The container can also have a piston having a face that urges the composition through the nozzle upon application of force or pressure to the piston (e.g., pressure exerted upon the piston by a pressurized reservoir). The shape of the container can be adapted to fit a caulking gun or other conventional device for applying caulks or sealants.

The invention includes a pressurized container containing the grout composition described herein. In one embodiment, the container has a valved outlet in fluid communication with the interior of the container for dispensing the composition from the container under pressure upon actuation of the valve and a nozzle in fluid communication with the outlet of the valve, for directing the dispensed composition. The nozzle can have a dispensing end adapted to fit between ceramic tiles (e.g., between tiles spaced not less than 0.5, 0.25, 0r 0.125 inch apart). The nozzle can also (or instead) have a shaping edge (e.g., a rounded portion of the nozzle) adjacent the dispensing end, such that the surface of the dispensed composition can be shaped by sliding the shaping edge along the surface. The nozzle can also (or instead) have a stabilizing member for sliding against a tiled surface while dispensing the composition. Each of these aspects can be unitary with the nozzle, fixed thereto, or attachable and detachable therefrom.

The interior of the grout-filled container can have a piston interposed between a pressurized portion of the container and a second portion of the container. The second portion fluidly communicates with the valve and can contain the composition. For example, the container can have a substantially circular cross-section and a first portion adjacent the outlet that contains the grout composition. A second, pressurized portion of the container (e.g., a pressurized bladder or a space containing a pressurized gas) is disposed on the opposite side of the grout composition than the outlet. A slidable disk- or cup-shaped piston can be disposed between the first and second portions. When the outlet is opened, the pressurized portion urges the piston axially along the substantially cross-section of the container against the first portion, forcing the grout composition out of the outlet.

The invention further relates to a method of waterproofing a surface having tiles adhered thereto. The method comprises filling interstices between the tiles with a grout composition described herein.

In another aspect, the invention relates to methods of making a grout composition described herein.

The invention includes compositions in which the latex comprises a plurality of acrylic polymers.

The containers described herein can include a piston having a face that urges the composition through the nozzle upon application of force pressure to the piston. The shape of the container can be adapted to fit a caulking gun, whereby the caulking gun can be used to apply pressure to the second face of the piston and dispense the composition through the nozzle. The dispensing end of the nozzle can, for example, be adapted to fit between ceramic tiles spaced not less than 0.5, 0.25, or 0.125 inch apart.

In another embodiment of the container described herein, the dispensing end of the nozzle defines an orifice through which the composition can be dispensed and a shaping edge adjacent the orifice, whereby the surface of the dispensed composition can be shaped by sliding the shaping edge along the surface. The shaping edge can have a rounded shape for imparting a concave shape to the surface of the dispensed composition when the shaping edge is slid along the surface.

The nozzle of the container described herein can include a stabilizing member for sliding against a tiled surface while dispensing the composition. The stabilizing member can be unitary with the nozzle.

In the methods described herein, the interstices can be filled by applying the composition to the tiled surface, urging the compostion into the interstices, and thereafter removing excess composition not contained within the interstices.

BRIEF SUMMARY OF THE SEVERAL VIEWS OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein:

FIG. 3, comprises FIGS. 3A, 3B, 3C, and 3D.

DETAILED DESCRIPTION OF THE INVENTION

Figure 1:
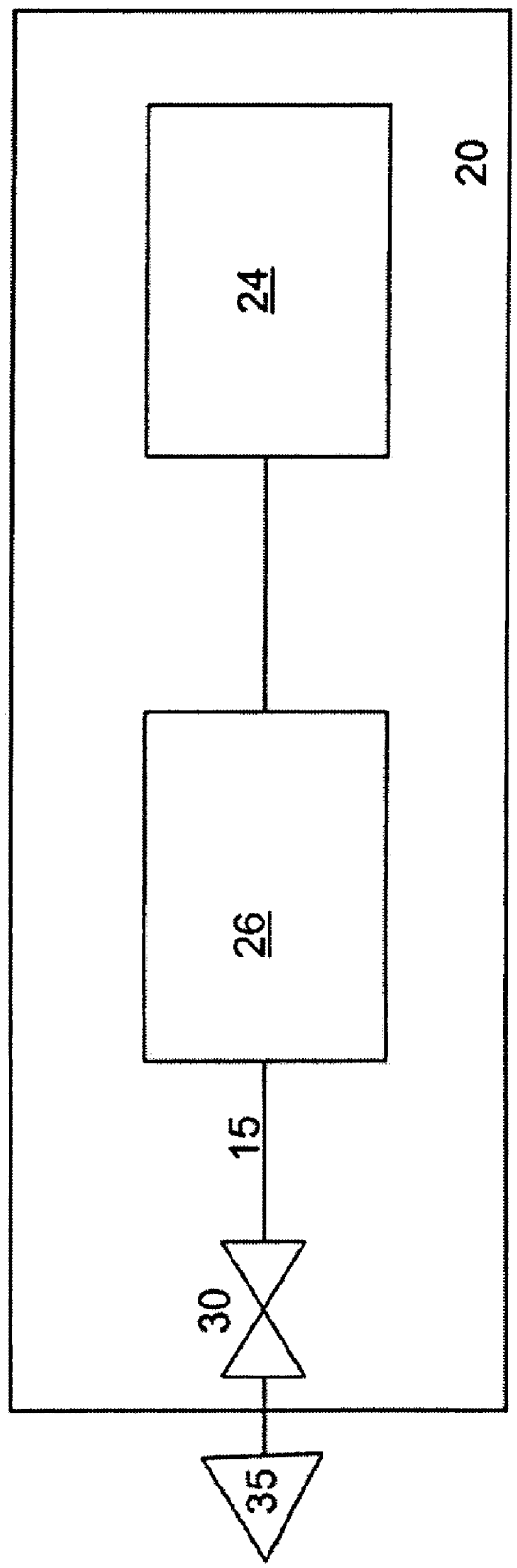
FIG. 1 is a schematic diagram that shows the arrangement of the components in one embodiment of the apparatus described herein for dispensing grout.

The invention relates to grout compositions that exhibit the appearance of traditional cementitious grouts and other sand-containing ("sanded") grouts without exhibiting the extremely abrasive properties of such grouts. In almost all applications, the degree of hardness and the abrasiveness exhibited by traditional grouts are greater than the hardness and abrasiveness that are necessary for the particular application. The extreme hardness and abrasiveness of traditional grouts are largely vestiges of traditional methods of making grouts. Because the grout compositions described herein are less abrasive than prior art grouts, they can be used in ways (e.g., application using pressurized containers) that prior art grouts cannot. In addition to their flexibility with regard to use, the grout compositions described herein retain the pleasing textured appearance and feel of sanded and cementitious grouts.

Definitions

As used herein, each of the following terms has the meaning associated with it in this section.

The "average particle size" of a collection of particles means the weight-averaged particle size (as opposed to the number-averaged particle size). Half of the weight of the particles in the collection have a size larger than the average particle size, while 50% by weight have a smaller size.

A "piston" is a solid, generally non-deformable body that has at least one face and that is movable within a container, cavity, tube, or other enclosure. Pressure or force applied to the body to move the piston is transmitted to the face, which can transmit the force to a material (e.g., a grout composition) that contacts the face within the enclosure.

A "polymeric resin" is a fluid form of a polymer or a fluid precursor of a polymer that is polymerized to form the polymer.

"Grout workability" refers to the consistency of grout compositions typically employed in tile grouting applications. The consistency of grout can differ based on the particular application. For example, grout applied to vertical surfaces (e.g., tiled walls) must be sufficiently viscous that it will not run or fall out from the vertical interstices between tiles, but must retain sufficient deformability that it can be packed or shaped as desired in order to obtain an aesthetically pleasing surface. Grout used in supported horizontal applications (tile floors, for example) can be less viscous.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation during practice of the invention. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling, and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. In the claims, means-plus-function clauses are intended to cover the structures described, suggested, or rendered obvious by the written description or drawings for performing the recited function, including not only structural equivalents but also equivalent structures.

DETAILED DESCRIPTION

The invention relates to grout compositions that exhibit the appearance of traditional cementitious grouts and other sanded grouts without exhibiting the extremely abrasive properties of such grouts. Because the grout compositions described herein are less abrasive than prior art grouts, they can be used in ways (e.g., pressurized application) that prior art grouts cannot. In addition to their flexibility with regard to use, the grout compositions described herein retain the pleasing textured appearance and feel of sanded and cementitious grouts.

The grout composition comprises at least three components, namely a polymeric resin, a first mineral filler, and a second mineral filler. The first mineral filler has an average particle size greater than 100 micrometers and the mineral particles of the first mineral filler exhibit a Mohs hardness less than about 6.5. The second mineral filler has an average particle size less than 100 micrometers. The polymeric resin is air-dryable and is present in an amount sufficient to bind the first and second mineral fillers upon drying of the composition. The first mineral filler gives the dried grout composition the appearance, texture, and feel of a traditional sanded cementitious grout.

The grout composition can also include one or more of a variety of other constituents. A variety of additives (e.g., wetting agents, solvents, antifoams, thickening agents, and agents that modulate the rate at which the grout dries) are known in the art to be useful components of grout compositions, and substantially any of those additives can be included in the grout composition described herein. The grout composition can also include components that confer beneficial properties to the dried grout. By way of example, the grout composition can include a dye or colorant to impart a desired color to the dried grout composition. A biocidal agent can also be incorporated into the grout composition, to inhibit growth of organisms in or on the finished grout. Incorporation of one or more water-repelling agents (e.g., a water-repellant polymer) into the grout composition can enhance the water resistance (and useful lifespan) of the grout composition.

An important advantage of the grout composition described herein is that it is suitable for application to a tile surface in a variety of different ways. The grout composition disclosed herein can be manually applied using a trowel and float, as with traditional grouts. It can be packaged and sold in cartridges adapted to fit standard caulking guns and other applicators to facilitate application with caulking guns or other applicators. It can be packaged, sold, and applied in a manually-squeezable tube, such as the type of tube in which various adhesives, caulks, and sealants are presently sold.

Unlike most or all previous grout compositions, the grout composition described herein is suitable for packaging into a pressurized container, such that the grout composition can be applied to the interstices of a tiled surface by actuating a valve that seals the container. Prior art grouts are not suitably packaged in this manner, since the sand, cement, or other components of the grouts are highly abrasive and cause serious damage to machinery used to package pressurized containers. Application of a grout composition in the form of a pressurized can-type container is a highly desirable application method, particularly in situations in which the person applying the grout is not an experienced mason, in which only a relatively small amount of grouting needs to be done, or in which the person applying the grout wishes to perform the work intermittently. The grout composition described herein is useful in each of these situations (in addition to traditional grouting applications).

Another advantage of the grout compositions described herein is that they can be formulated to resist shrinking (relative to freshly-applied grout) and cracking of the dried grout. As the size of the crack or hole to be filled using the grout increases, the importance of the anti-shrinking and anti-cracking properties of the grout composition increases.

The invention includes grout compositions, methods of using them, and apparatus for applying them. Further details of the components of the grout composition, certain apparatus useful for containing and applying the grout compositions, and methods of using the grout composition are described below.

The Polymeric Resin

The grout composition described herein includes at least one polymeric resin. The resin comprises at least one polymer and at least one solvent. The resin can contain multiple polymers, multiple solvents, or both multiple polymers and multiple solvents. The polymer(s) and solvent(s) should be miscible with one another. Suitable polymers and solvents are known in the art, and include those used as binders in previously-known grouts, cements, and concretes. Polymers traditionally used in caulks and other sealants can also be incorporated into the grout composition described herein. However caulk/sealant polymers often have a glossy finish that is not normally associated with grouts, and incorporation of such polymers in the grout compositions described herein should be limited so as to avoid a glossy or high-sheen finish. Grout compositions having a matte, dull, sandy or other textured finish are preferred.

A preferred type polymer is the class of polymers known as acrylic latexes. A wide variety of acrylic latex resins, colloids, and suspensions are commercially available, each with its own characteristics. The particular acrylic latex and the corresponding resin that should be selected for a grout composition can be determined based on the intended end use of the grout composition. For example, in applications in which the appearance of the finished grouted surface is more important than the durability or impact resistance of the grout, the polymeric resin can be selected primarily on the basis of its color, workability, and non-shrinking character. As another example, in applications in which the water-resistance of the finished grouted surface is a primary consideration, the polymeric resin can be selected primarily on the basis of the water-repelling characteristics of the polymer, the ability of the polymeric resin to cure in the presence of water, the drying (curing) time of the resin, and the crack resistance of the cured resin. Further by way of example, in applications in which the durability and impact resistance of the finished grout are the paramount concerns, the polymeric resin can be selected to yield high durability and impact resistance.

An example of a suitable acrylic latex polymer that can be incorporated into a general purpose grout composition is the acrylic copolymer sold commercially as RHOPLEX (Registered Trademark, "RTM") brand colloid (Rohm & Haas Company, Philadelphia, Pa.). Other suitable acrylic latexes include homopolymers of acrylate, homopolymers of methacrylate, and copolymers of acrylate and methacrylate.

Other suitable polymers that can be incorporated into the grout composition in place of, or in addition to, acrylic latexes include polymeric silanes and polysilazanes. Polymers in which silane coupling agents (e.g., vinylbenzyl chloride products available from Dow Chemical Company, Midland, Mich.) are incorporated are also suitable, the coupling agents being able to link organic polymer systems with inorganic substrates, such as the first and/or second mineral fillers. An example of a suitable coupling agent is the product designated AP-SILANE 33 (Trademark, "TM"), obtained from Advanced Polymer, Inc. (Carlstadt, N.J.). Other polymers can be used as well or instead, such as polymers used in known caulks and sealant products.

The polymeric resin must be air-dryable, meaning that if the grout composition is dispensed into a crack and the surface of the grout is thereafter maintained in contact with ambient air, then substantially all of the solvent(s) in the grout composition will disappear (e.g., by evaporation) within days, weeks, or months following the application. Under normal, atmospheric conditions, it is preferable that the finished grout composition be substantially free of solvents (i.e., >90% of solvents have disappeared) within 48 to 72 hours after application. Grout compositions from which a substantial fraction (e.g., >75%) of solvent evaporates or otherwise disappears within 24 hours after application are also preferable. The polymeric resin can include more than one solvent, wherein the volatility of at least one solvent is significantly greater than another solvent in the resin at the anticipated application or drying temperature. Such a resin can be used to cause the grout composition to set relatively quickly while completely drying more slowly (e.g., to facilitate enhanced polymer cross-linking or entanglement).

Because grouting is often performed in enclosed areas (e.g., in interior rooms of houses, such as bathrooms and kitchens), non-toxic and non-irritating solvents are preferred, particularly in situations in which the grout composition is to be used or sold for use in occupied buildings. Many acceptable solvents are known. Water is a preferred solvent and exhibits no known toxicity or irritation. Regardless of the solvent used, it is recommended that any area enclosing the grouted surface be ventilated during and after application of the grouting composition described herein.

The grout composition must contain enough of the polymeric resin that the polymer contained in the resin is present in an amount sufficient to bind the first and second mineral fillers into a common mass once the solvent(s) in the resin are no longer present. The necessary amount of the polymer (and the corresponding resin) depends on the properties of the particular polymer(s) and fillers used, the presence of wetting agents, surface-modifying or coupling agents, the degree and energy of mixing, and other factors that are within the ken of the skilled artisan. This information can also be readily derived empirically simply by preparing a plurality of test compositions. Suitable grout compositions can include from 15% to 70%, by weight, polymeric resin; however, grout compositions having very high (e.g., >50%) polymeric resin content can fail to resemble sanded grouts. Preferred polymeric resin content values are 20% to 35% by weight (more preferably, 25% to 30%).

The First Mineral Filler

The first mineral filler is a particulate that acts as a filler and imparts a highly textured appearance to the finished grout. The particles of the first mineral filler have an average particle size that is greater than at least 160 micrometers. Depending on the texture, feel, and appearance desired, particulate compositions having a larger average particle size (e.g., 200, 300, 500, 700, 1000, 1500, or 2000 micrometers) can be used as the first mineral filler.

Sand used in traditional grout composition generally has grains that range in size from 160 to 700 micrometers. Fine-grained sands (e.g., particle sizes 185–245 micrometers) are desirable in many applications in which appearance, and tactile texture are important. Sand size distributions vary depending on the source of the sand and how it is sifted, cleaned, or otherwise processed. Substantially any sand particle size and size distribution can be replicated using first mineral filler particle sizes and size distributions. For example, desirable first mineral particle sizes include particles that range is size from 160 to 700 micrometers. First mineral fillers containing predominantly particles in the range 185–245 micrometers in size yield a grout composition having a fine-grained appearance. In one preferred composition, at least 80%, by weight, of first mineral filler particles in a grout composition described herein have a size in the range from 160 to 700 micrometers, and more preferably at least 80%, by weight, of those particles have a size in the range from 185 to 245 micrometers.

The uniformity of sizes of the particles in the first mineral filler is not critical, and selection of a first mineral filler on the basis, for example, of a particle size uniformity coefficient (e.g., the mesh opening size through which 60% of particles pass divided by the mesh opening size through which 10% of particles pass) can be made to accommodate aesthetic considerations such as the effect of the filler on the texture or other appearance of the finished grout.

An important characteristic of the particles of the first mineral filler is that the particles must not exhibit a greater hardness than the hardness of the materials that the grout composition contacts during preparation, processing, or both, of the composition. Sand, cement, and other relatively hard mineral components of prior art grouts have made packaging those prior art grouts into pressurized containers impractical, owing to the abrasive properties of those hard minerals. It has been discovered that relatively large particles of less hard minerals can replicate the appearance of sanded and other textured cementitious grouts without exerting the abrasive effect on processing and packaging machinery that was observed with prior art grouts.

Steel is a common component of chemical processing and packaging equipment. The hardness of a steel depends on a number of factors, including its composition and how it was treated during formation and subsequent fabrication. Generally, however, steels exhibit a hardness value of at least about 6.5 on the Mohs hardness scale. It has been discovered that if the relatively large mineral filler particles in a grout composition exhibit a hardness less than 6.5, then abrasion of processing and packaging materials can be reduced significantly. Preferably, the Mohs hardness of the particles of the first mineral filler of the grout composition disclosed herein is not greater than 6, 5, 4, or 3. A preferable mineral filler is particulate calcium carbonate (also known as calcite), which exhibits a Mohs hardness of approximately 2.5. Without wishing to be bound by any particular theory of operation, it is believed that if the Mohs hardness of the particles of the first mineral filler is lower (at least one Mohs scale units lower, and preferably at least two Mohs scale units lower) than the Mohs hardness of the materials from which the grout-contacting portions of a grout packaging machine are made, then the grout composition described herein will not exert excessive wear on the machine, thereby making packaging of the grout into pressurized containers practical.

Although the relatively large particles of a grout appear to be the primary cause of the abrasive effects exerted by grouts on packaging machinery, smaller particles can also abrade and wear such machinery. In the grout composition described herein, it is preferable that no particulate component of the composition (in its fluid form) exhibit a Mohs hardness greater than that of a machine used to package it into a pressurized container. For example, the grout composition can be formulated so that no particulate component exhibits a Mohs hardness greater than 6.5, 6, 5, 4, or 3. By way of example, if the hardest mineral particulate contained in the grout composition is calcite (i.e., calcium carbonate), then the composition does not comprise a particulate component exhibiting a Mohs hardness greater than about 2.5.

The first mineral filler should be selected so that the mineral particles thereof do not dissolve or degrade significantly over time in the grout composition. The first mineral filler is also desirably relatively inexpensive and easily obtained. Calcium carbonate is commercially available in a variety of forms, including in fractions separated by particle size, whiteness, surface treatment, and the like.

Selection of an appropriate first mineral filler can also be influenced by the anticipated end use of the grout. For grouts that will not be exposed to significant wear or abrasion after installation, appearance, availability, and cost concerns can outweigh wear resistance in selecting a first mineral filler. In such applications, first mineral fillers having relatively low hardness (e.g., Mohs hardness <4, <3, or <2.5) can be suitably used. If significant wear or abrasion of installed grout is anticipated, a harder filler (e.g., 5<Mohs hardness <6.5) can be used so that the grout retains its "sanded" appearance and texture in spite of the wear or abrasion.

The appearance of the grout composition can be significantly affected by the color and the shape of the mineral particles in the first mineral filler. In some embodiments, white mineral particles are preferred. Generally cubical mineral particles will closely mimic the appearance of sand. Mineral particles having substantially any crystal shape can be used, although particles having an aspect ration (i.e., longest characteristic dimension divided by smallest characteristic dimension) less than about 5 or 10 are preferred. Generally cubic (e.g., longest characteristic dimension divided by smallest characteristic dimension <1.5) are preferred in applications in which the first mineral filler is intended to have the appearance of a sanded grout.

The Second Mineral Filler

The second mineral filler is a particulate that has an average particle size less than 600 micrometers. Preferably, the average particle size of the second mineral filler is significantly less than 600 micrometers (e.g., <300 micrometers, <120 micrometers, or <85 micrometers). The average particle size of the second mineral filler is preferably not less than 50 micrometers and more preferably not less than 90 micrometers. Use of second mineral filler particles smaller than 50 micrometers is possible. However, the effect of such particles on viscosity of the resulting grout composition can be undesirable unless other viscosity-lowering ingredients are included. In one embodiment, at least about 80%, by weight, of second mineral filler particles are in the size range 50–600 micrometers. In a preferred embodiment, at least about 80%, by weight, of the second mineral filler particles are in the size range 90–120 micrometers. The second mineral filler acts primarily as a simple filler, as such fillers are typically used in plastics.

The hardness of mineral particles in the second mineral filler is not critical. Preferably, the particles of the second mineral filler exhibit a Mohs hardness not greater than that of the parts of packaging machinery that contact the grout composition. For example, the hardness of particles in the second mineral filler should be not greater than 6.5 (6, 5, 4, or 3). Suitable materials that can be used as the second mineral filler include sands, calcium carbonate, ashes (e.g., coal furnace fly ash), and glass beads. Particles of minerals having a Mohs hardness from 2 to 4 are preferred. Because the color of the second mineral filler can significantly affect the color of the grout composition and the finished grout, the second mineral filler should be selected to conform with the desired grout color. For example, a gray particulate can be used as the second mineral filler for gray grout compositions. White minerals are compatible with most, if not all, colors of grout, and white particulate minerals such as calcium carbonate are suitable in many applications.

The mineral content of the first and second mineral fillers can be composed of the same or different minerals. By way of example, the first and second mineral fillers can both be calcium carbonate particulates. In some embodiments, a single mineral filler having a relatively broad or biphasic particle distribution can be used as both the first and second mineral fillers. It is immaterial whether separate mineral fillers having the properties recited herein for the first and second mineral fillers are combined or, alternatively, a single mineral filler comprising particles having sizes described for the first and second mineral fillers is used.

The absolute and relative amounts of the first and second mineral fillers used in the grout described herein depends on the desired texture, feel, or appearance of the finished grout. A higher content of first mineral filler increases the 'sandiness' or coarse texture of the grout. A higher overall (i.e., first+second+any other) mineral filler content decreases the degree of shrinkage of the grout composition upon drying. Increasing the amount of the second mineral filler increases the viscosity of the grout composition.

Suitable overall mineral filler content values for grout compositions described herein include 30% to 80%, more preferably 50% to 70%, and more preferably 55% to 65% (all percentages are percent, by weight, of the wet {i.e., non-dried} grout composition). The grout composition can include approximately equal (by weight) amounts of the first and second mineral fillers. Alternatively, the grout composition can include up to a two-, three-, or four-fold excess of one of the first and second fillers, relative to the other. On a percentage (of wet grout composition weight) basis, the amount of first mineral filler in the grout composition can range from 5% to 70%, although amounts in the range from 20% to 40% will more nearly resemble traditional sanded grouts. The grout composition can include the second mineral filler in amounts from 5% to 60%, and preferably contains the second mineral filler in an amount from 20% to 40%. One preferred grout composition comprises about 25% (by wet weight) polymers, about 28.5% first mineral filler, and about 32.5% second mineral filler. Colorants, solvents, and various additives described herein make up the remainder of that composition.

Other Ingredients

In addition to the polymeric resin and the first and second mineral fillers, the grout composition can include a variety of other ingredients. Such ingredients include ingredients that are known by skilled artisans to be useful additives for grouts, cements, concretes, and filled plastics. Examples of suitable ingredients include polymer-soluble dyes, colorants, solvents, antifoams, wetting agents, biocides, sealants, thickening agents, drying rate modulators, coupling agents, stabilizers, plasticizers, flow modifiers, lubricants, and additional fillers. Selection of such additives and suitable amounts thereof is within the ken of the skilled artisan in this field, and can be made depending on the composition and properties of a particular grout and its desired use.

One or more colorants can be incorporated into the grout composition in order to impart a desired color to the grout composition, to the finished grout, or both. The colorant can be a particulate (e.g., one of the first and second mineral fillers) or a compound that is soluble in one or more of the solvents in the grout composition. The colorant should be substantially uniformly dispersed or dissolved throughout the grout composition, in order to avoid color variations in the finished grout. Particulate colorants (i.e., pigment particles) and polymer-soluble dyes can be used interchangeably or in combination, depending on the desired effect. For example, particulate, polymer-insoluble colorants should be used when a finished grout having non-colored matrix containing colored particles is desired. Examples of suitable colorants include titanium dioxide (a white mineral particulate), carbon black (a black mineral particulate), and anthraquinone and azo dyes (polymer-soluble colorants).

In addition to the solvent(s) of the polymeric resin, the grout composition can include one or more other solvents. The additional solvent(s) should be miscible with the solvent(s) of the polymeric resin, in order to avoid phase separation during processing, packaging, storage, or use. The additional solvents can be more or less volatile than the solvent(s) of the polymeric resin, and can therefore affect the drying/curing rate of the grout composition. For example, the additional solvents can include both relatively volatile solvents (e.g., mineral spirits) and less volatile solvents (e.g., water). In addition to their effects on the grout composition, additional solvents can aid in preparation of the composition, for example, by suspending or dissolving a component of the composition prior to its mixing with the other components of the grout composition.

The grout composition can include one or more antifoaming agents in order to inhibit formation of foam during preparation of the composition. Inhibiting foam formation can decrease the amount of air suspended in the composition during mixing and ensure that ingredients added to the composition are mixed therewith. An example of a suitable wetting agent is the FOAMASTER (RTM) III product available from Congis Corporation (Cincinnati, Ohio).

One or more wetting agents can be included in the composition in order to enhance contact of particulates (e.g., the first and second mineral fillers) with the polymers and other ingredients of the grout composition. Binding of the polymers with the particulates and/or envelopment/encapsulation/coating of the particulates by the polymers enhances the uniformity of the grout composition and the unity of the dried/cured grout. This also inhibits shedding of particulates from the dried/cured grout, preserving the physical properties, texture, feel, and appearance of the grout. Examples of suitable wetting agents include detergents such as the TRITON (RTM) X-405 product available from Union Carbide Corporation (Danbury, Conn.) and dispersants such as the TAMOL (RTM) 850 product available from Rohm & Haas Company (Philadelphia, Pa.).

One or more biocides can be added to the grout composition in order to inhibit growth of microorganisms, fungi, mold, and plants in the composition and in the finished grout. Numerous biocides are known in the art and available commercially. The selection of an appropriate biocide can depend on the geographical location and intended use of the grout composition. An example of a suitable biocide is the ACTICIDE (RTM) CT product available from Acti-Chem Specialties Products (Trumbull, Conn.).

When the environment in which the grout composition is to be used includes water or other chemicals that can penetrate and harm the grout, for example, one or more sealants can be incorporated into the grout composition. Numerous sealants are known in the art and available commercially. The selection of an appropriate sealant can depend on the intended use and anticipated environment of the grout composition, as well as on the nature of the chemicals expected in such use and environment. An example of a suitable sealant is an ester of wood rosin, such as the HERLYN (RTM) D hydrogenated methyl ester of wood rosin product available from Loos & Dilworth, Inc. (Bristol, Pa.).

The grout composition can include one or more thickening agents to improve the consistency and/or workability of the grout composition. Numerous thickening agents are known in the art and available commercially. An example of a suitable thickening agent is the ACRYSOL (RTM) 186B product available from Rohm & Haas Company (Philadelphia, Pa.).

Drying rate modulators such as polyhydric alcohols can be added to the grout composition in order to slow the rate of drying. Such modulators can be beneficial when the environment in which the grout is to be used exhibits a low humidity or high air flow. An example of a suitable drying rate modulator is polypropylene glycol.

The grout composition can include one or more coupling agents for improving the binding or encapsulation of filler particles by the polymer(s) of the composition. Suitable coupling agents can effect covalent, ionic, or other non-covalent binding of the polymer and the particles. Many coupling agents are known in the art, and selection of an appropriate coupling agent depends on the chemical identity and form of the polymer(s) and particulate(s) present in the composition. Nonetheless, selection and addition of suitable coupling agents are within the ken of the skilled artisan in this field. Examples of suitable coupling agents include polymeric silanes and polysilazanes.

In applications in which it is desirable that the finished grout exhibit plastic properties (e.g., deformability, resilience, and/or flexibility) rather than cementitious properties alone, stabilizers, plasticizers, and/or lubricants can be included in the grout composition in order to impart their characteristic properties to the finished grout. A wide variety of plastic additives are know, and selection and incorporation of such additives depends on the chemical identity of the polymer(s) used in the grout composition and desired properties of the finished rout. Nonetheless, selection and incorporation of suitable stabilizers, plasticizers, and/or lubricants are within the ken of the skilled artisan in this field.

The grout composition can also include a water-repelling polymer. The water-repelling polymer can be substantially any polymer that is compatible with the other ingredients of the composition and that imparts hydrophobicity to the grout composition or the finished grout. Such polymers can be used when the grout is anticipated to be installed in a wet environment or when water resistance of the finished grout is considered important. A wide variety of suitable water-repelling polymers are known, including fluorochemical polymers, styrene maleic anhydride copolymers, and poly-alkylsiloxanes such as polydimethylsiloxane. Other suitable water-repelling polymers include those sold under the SCOTCH-GARD (RTM) trademark (3M Company, St. Paul, Minn.)

Grout Dispensers

The grout compositions described herein can be packaged in substantially any way currently known for packaging grout. The grout compositions described herein exhibit significantly lower abrasiveness than prior art grouts. This property permits packaging of the grout composition described herein in ways that cannot be practically done using prior grouts.

The grout composition described herein can packaged and sold in the form of a dry powder to be mixed with a solvent (e.g., water) by the user immediately prior to use. However, because the grout composition does not begin to set immediately upon water addition, as with cementitious and epoxy-based grouts, the grout composition described herein can be stored in a fully prepared (i.e., wet) form for long periods, so long as the composition is stored in a sealed container or in a very humid atmosphere. Thus, the grout composition described herein can be packaged and sold in a 'ready-to-use' form. This form is particularly desirable for homeowners and non-professional masons who wish to install, repair, or replace grout in a tiled surface.

In a powdered form, the grout composition described herein can be sold in any traditional form (e.g., paper or plastic bags, plastic or metal tubs or cans, or in bulk). In a wet (i.e., fully prepared) form, the grout composition described herein can be packaged and sold in any sealed container or apparatus. For example, the wet grout composition can be sold in bulk tubs, cans, buckets, or bags suitable for traditional manual grout installation (e.g., using a trowel and float).

In a preferred embodiment, the wet grout composition is packaged and sold in a container that can be used as an applicator or as a replaceable part (e.g., a cartridge or reservoir) of an applicator. By way of example, the wet grout composition can be packaged and sold in manually squeezable tubes having a nozzle that can be inserted between tiles or urged against a tiled surface. As another example, the wet grout composition can be packaged and sold in cartridges adapted to fit a standard caulking gun or another standard cartridge-fed applicator. Many prior art grouts can also be packaged and sold in these forms.

Unlike prior art grouts, the grout composition described herein is suitable for packaging and sale in pressurized and pressurizable containers.

For example, the grout composition can be packaged and sold in a container having a sealed outlet and a compressible portion. When the outlet is unsealed and the compressible portion is compressed, the grout composition is dispensed from the outlet. Examples of such containers include the squeezable tube and cartridge embodiments described above. Other examples include a container in which a bladder or pouch which communicates with the outlet contains the grout composition. Application of pressure to the exterior of the bladder or pouch (e.g., by pressurization of the container or by the action of a pressurized second bladder on the grout-containing bladder) forces the grout composition to be dispensed from the outlet. The outlet can be sealed with a valve in order to regulate dispensing of the grout.

In a preferred embodiment, the grout composition is contained within a pressurized container having a valved outlet in communication with the interior thereof. When the valve is actuated, the grout composition is dispensed from the container by way of the outlet. The outlet can fluidly communicate with a nozzle to facilitate controlled or directed release of the grout composition.

Because the grout composition described herein is substantially incompressible (or, at most, not very compressible), the pressurized container must include a pressure source. Substantially any pressure source suitable for use with a sealed container can be used. Examples of suitable pressure sources include compressed springs, compressed gas, and gas-generating chemical reactions. Compressed gas is a preferred pressure source.

FIG. 1 schematically illustrates one embodiment of the container. In the embodiment depicted in FIG. 1, a pressurized portion 24 of the container 20 applies pressure to a second portion 26 of the container 20 that contains the grout composition. The second portion 26 has an outlet 15 that fluidly communicates with the interior thereof. The outlet 15 includes a valve 30 and is fluidly connected with a nozzle 35. When the valve 30 is in the closed position, the composition cannot move through the outlet 15. However, when the valve 30 is opened, pressure from the pressurized portion 24 urges grout composition in the second portion 26 to pass through the outlet 15 and thence into and through the nozzle 35, which can be directed to apply the grout as desired.

Compressed gas can directly contact the grout composition, in which instance the container should generally be used in an inverted position, so that gravity draws the grout composition to the bottom of the container, covering the outlet. However, this configuration requires careful manipulation of the container and can limit the containers use to only certain geometric orientations, decreasing ease of use. Furthermore, compressed gas can generate a path through the grout composition to the outlet, leaving a substantial portion of the grout in the container undeliverable. For this reason, it is preferred that compressed gas in the container either be retained behind a solid structure (e.g., a slidable piston) or contained within a closed compartment (e.g., a sealed, flexible bladder) within the container. Pressure imparted by the compressed gas upon the solid structure or compartment can be transmitted to the grout composition if the structure or compartment also contacts the grout composition. In one embodiment, the solid structure is a piston that separates a compressed gas from the grout composition. The piston can, for example, be a substantially planar disk or cup-shaped. An expandable bladder can be used in combination with a piston or other solid structure, if desired.

Figure 2:
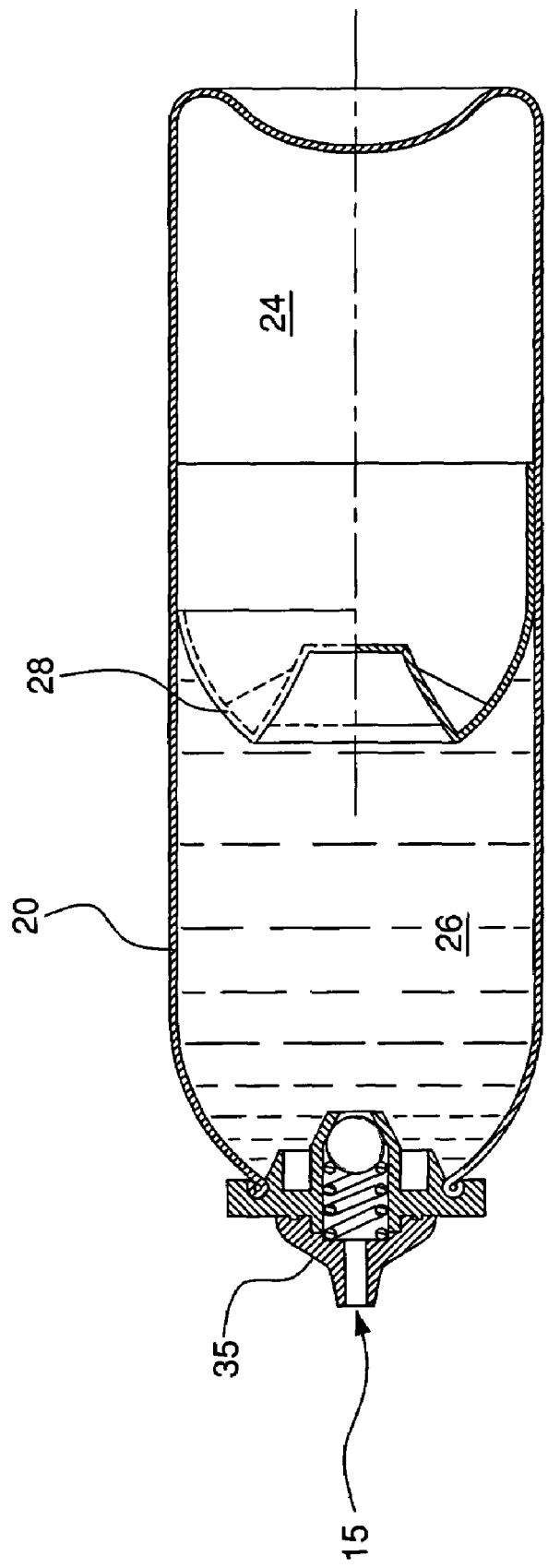
FIG. 2 is a front sectional view of an embodiment of a container 20 described herein. The container has a pressurized portion 24 and a second portion 26 which can contain the grout described herein.
Figure 3A:
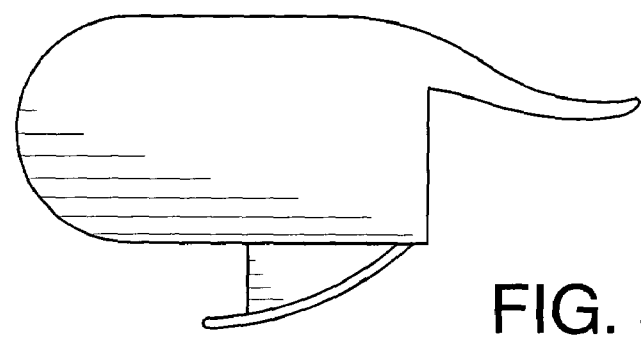
FIGS. 3A, 3B, and 3C are top plane, side elevation, and front elevation views, respectively, of an embodiment of the nozzle 35 described herein. This embodiment has a shaping edge 37 disposed near the dispensing end 36 of the nozzle 35 and a stabilizing member 39 disposed on the nozzle 35.
Figure 3B:
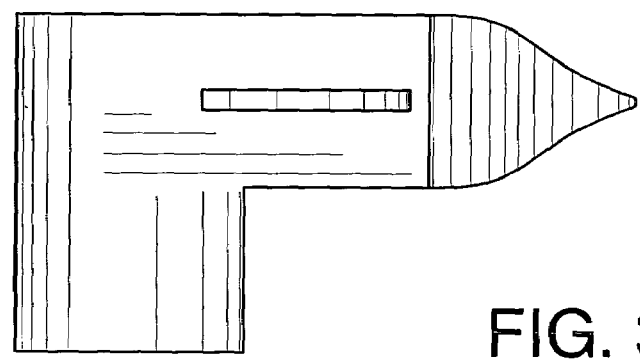
Figure 3C:
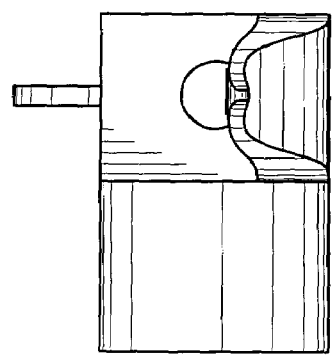
Figure 3D:
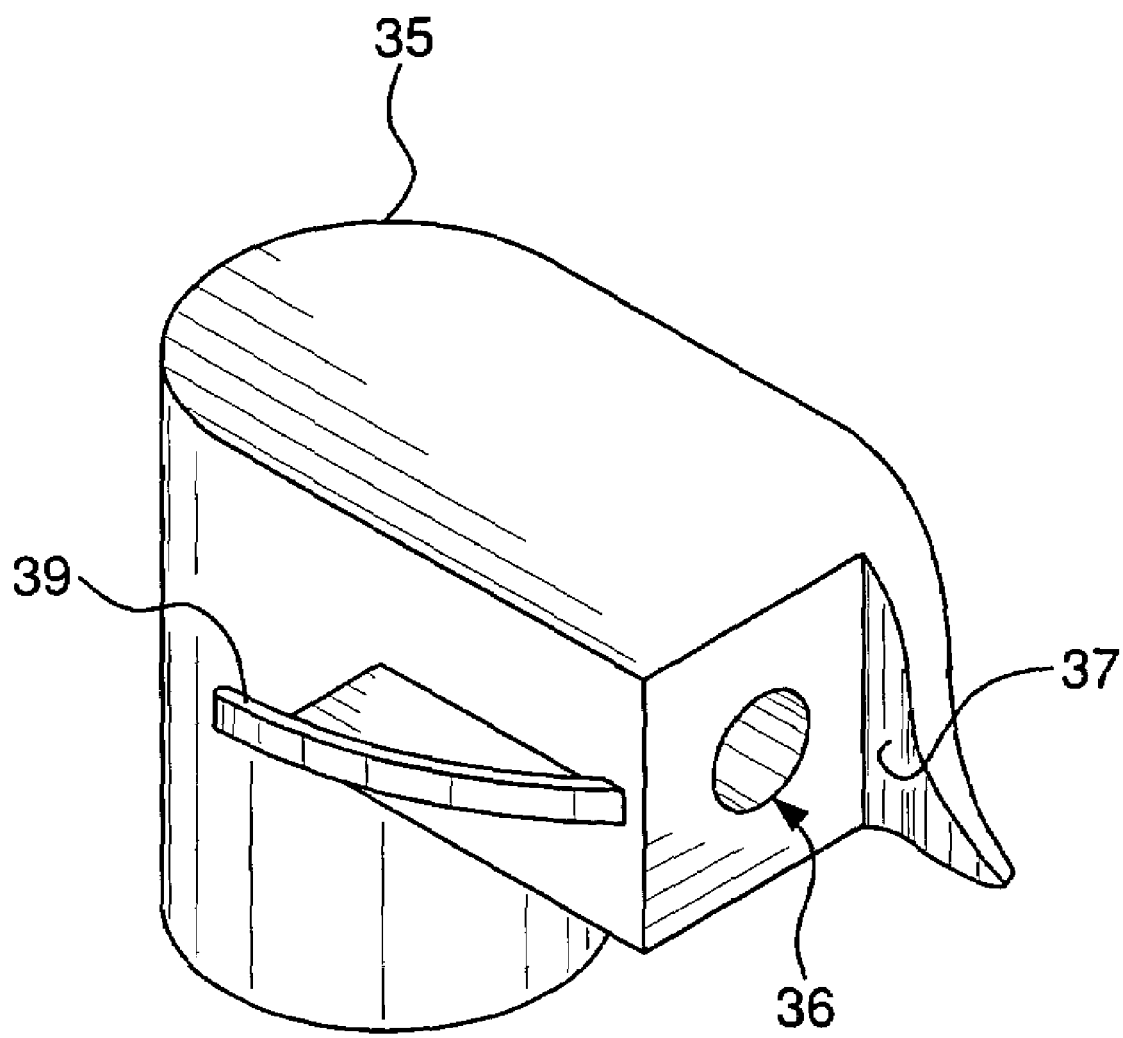
FIG. 3D is an isometric view of this embodiment.
Figure 4:
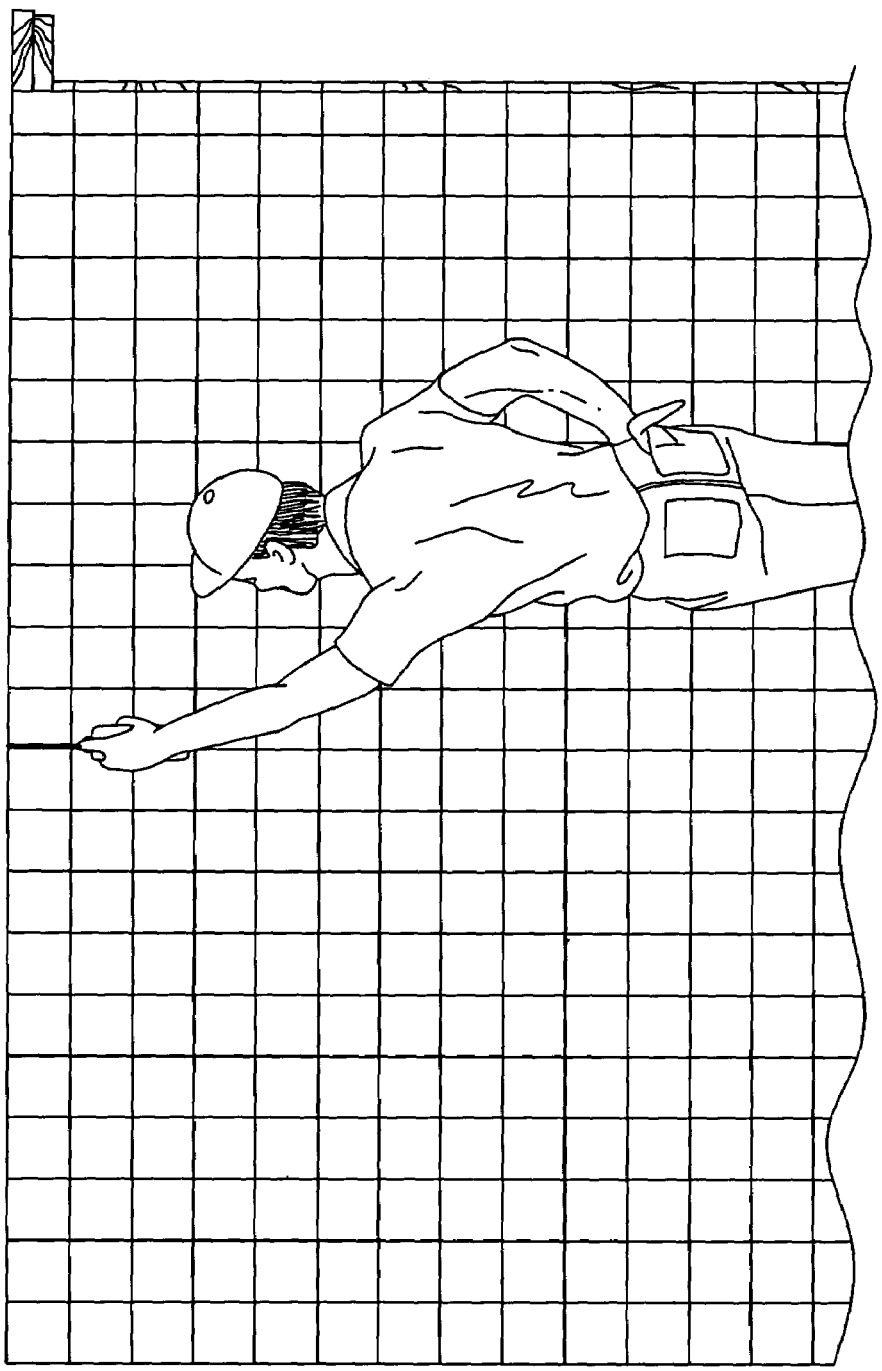
FIG. 4 is an illustration of use of a pressurized container to apply the grout composition described herein.
Figure 5:
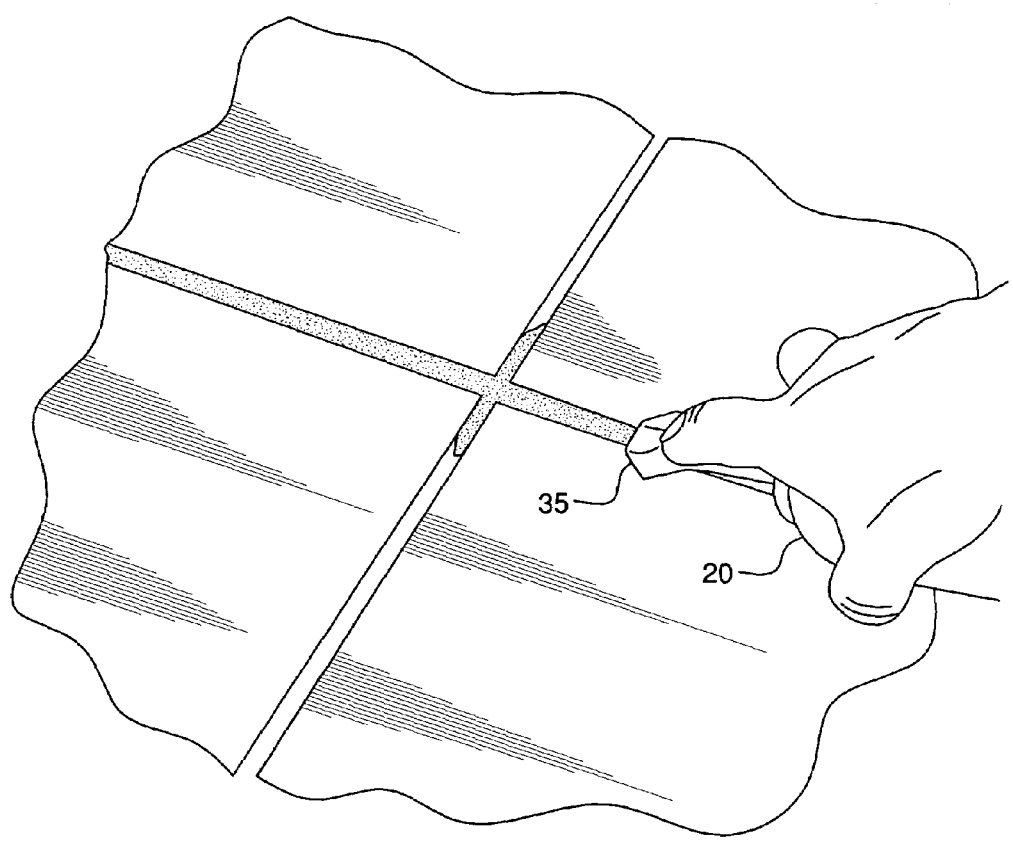
FIG. 5 depicts use of a pressurized container to apply the grout composition described herein by holding the nozzle of the container described herein near or against the surface of the tile to be grouted.
Figure 6:
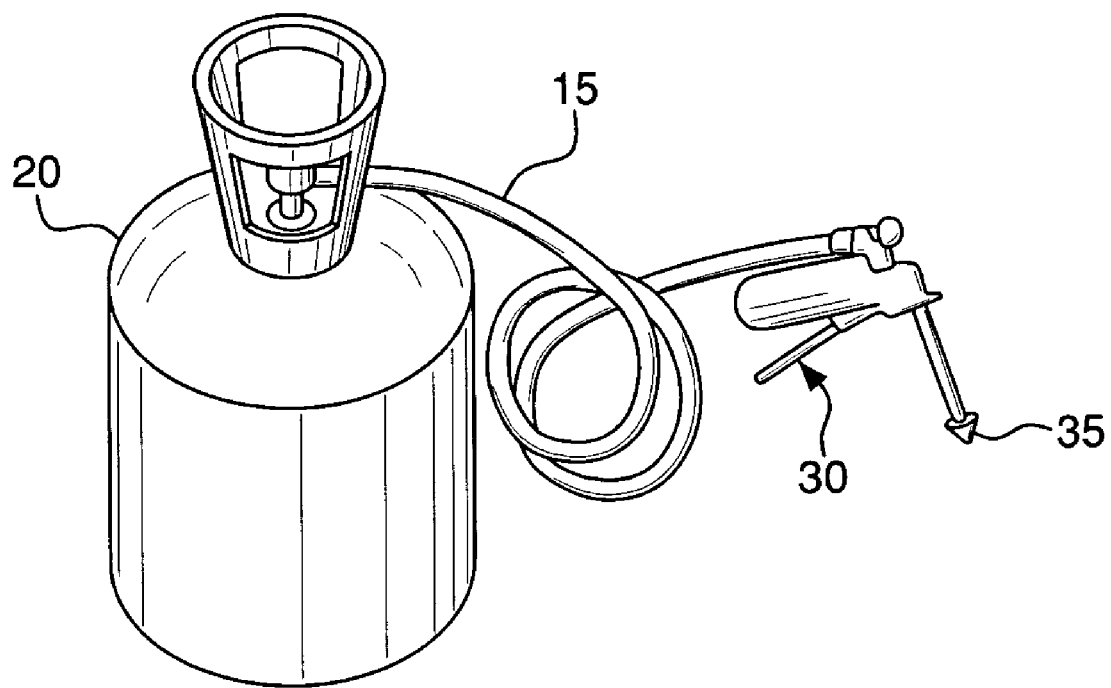
FIG. 6 depicts an alternative embodiment of a pressurized container 20 in which the outlet 15 is in the form of a hose that connects the interior of the container 20 with the nozzle 35 by way of an actuatable valve 30.

FIG. 2 schematically illustrates a second embodiment of the container. In the embodiment depicted in FIG. 2, the substantially cylindrical container 20 has a pressurized portion 24 and a second portion 26 that contains the grout composition. The two portions are separated by a slidable piston 28 that is urged axially along the container 20 toward the outlet 15 by pressure applied to the piston 28 by the pressurized portion 24 of the container 20. When the piston 28 moves toward the outlet 15, grout composition in the second portion 26 is urged to flow out of the container 20 through the nozzle 35 by way of the outlet 15. The container in FIG. 2 is shown without a valve or nozzle. Any of a variety of known valve/nozzle assemblies can be used to seal the container shown in FIG. 2.

A suitable nozzle has a portion adapted to fit the outlet of the container and a dispensing end for directing flow of the grout composition. The dispensing end can have a shape adapted to fit between ceramic tiles (i.e., partially or entirely within the gap between tiles). Alternatively, the dispensing end can be shaped simply to direct a stream or spray of the grout composition in a selected direction.

The nozzle can have a shaping edge disposed thereon (e.g., adjacent the orifice), wherein the shaping edge has a shape designed to impart a particular shape (e.g., a concave rounded shape) to the surface of dispensed grout by sliding the shaping edge along the surface.

The nozzle can also have a stabilizing member formed or applied thereon. The stabilizing member is designed to contact the tiled surface in a manner such that when the stabilizing member is pressed or slid against the surface, the dispensing end of the nozzle directs dispensed grout into a crack between tiles. The shape of the stabilizing member is not critical. It will generally include a planar face for sliding against the tiled surface and can also (or instead) have a raised portion for insertion within an inter-tile crack, to direct sliding of the nozzle along the crack. In one embodiment, the stabilizing member has the appearance of a short "ski" with a raised bump on the planar "bottom" of the ski. In this embodiment, the bump is inserted into an inter-tile crack, and the nozzle is drawn along the length of the crack. The planar portion of the ski maintains the dispensing end of the nozzle in a position in which grout dispensed therefrom is directed into the crack. The stabilizing member can be a unitary part of the nozzle or, for example, a removable piece which can be clipped onto the nozzle to accommodate both left-handed and right-handed users.

Grout Preparation

The grout composition described herein is made by combining the components thereof and mixing them, preferably very thoroughly. So long as the mixed composition is not permitted to dry, it can be stored indefinitely prior to application. Preferably, the grout composition is packaged into a sealed container, such as one of those described herein.

The order of addition of the ingredients of the grout composition is not critical. However, the final wet grout composition can be significantly more viscous than its ingredients. As a matter of convenience and processibility, it can be preferable to first mix some or all liquid ingredients prior to addition of the particulate ingredients, such as the mineral fillers. By way of example, the polymeric resin can first be combined with the ingredients to be incorporated at relatively low levels (e.g., antifoam, wetting agents, biocides, etc.) and other solvents as an initial step. Addition of any dye or colorant can be made to the liquid components of the composition while the liquids are at their least viscous stage, so that thorough mixing can occur and the color of the final grout composition can be as uniform as possible. Alternatively, any dye or colorant can be mixed at an early stage with the polymeric resin (and with any other ingredient with which mixing of the dye or colorant can be most difficult), and addition of other components can be suspended until satisfactory mixing is achieved. Multiple particulate or powdered ingredients can be pre-mixed prior to combining them with liquid ingredients.

EXAMPLES

The invention is now described with reference to the following Examples. These Examples are provided for the purpose of illustration only, and the invention is not limited to these Examples, but rather encompasses all variations which are evident as a result of the teaching provided herein.

Example 1

Grout Composition

A grout composition suitable for packaging in a pressurized container was made as follows. 557.49 Pounds of RHOPLEX (RTM) 2200 acrylic latex suspension was mixed with 168.23 pounds of RHOPLEX (RTM) A-920 acrylic latex suspension. As mixing continued, 0.98 pound of FOAMASTER (RTM) III antifoam, 6 pounds of TRITON (RTM) X-405 detergent, 1.56 pounds of ACTICIDE (RTM) CT bactericide/fungicide, and 8.06 pounds of TAMOL (RTM) 850 dispersant were added to the mixture. 14.18 Pounds of HERCOLYN (RTM) D hydrogenated methyl ester of wood rosin was combined with 14.67 pounds of mineral spirits, and that combination was added to the mixture. Thereafter, 28.36 pounds of titanium dioxide R706 (DuPont, Wilmington, Del.) and 800 pounds of calcium carbonate having an average particle size smaller than 100 micrometers (calcium carbonate product G260, J. M. Huber Corp., Marble Hill, Ga.) were added to the batch, with mixing. Next, 112.48 pounds of water, 25.43 pounds of propylene glycol (99.8% pure; Interstate Chemical Corp., Hermitage, Pa.) and 21.64 pounds of ACRYSOL (RTM) 186B thickener were added to the mixture. Finally, 700 pounds of calcium carbonate having an average particle size greater than 100 micrometers (calcium carbonate product 40-200, Imerys Actives Group, Roswell, Ga.) were added, and the mixture was thoroughly mixed.

Example 2

Flexible Grout Composition

A second grout composition suitable for packaging in a pressurized container was made as follows. 795.00 Pounds of RHOPLEX (RTM) A-920 acrylic latex suspension was mixed with 15.187 pounds of TRITON (RTM) X-405 detergent, 2.0 pounds of ACTICIDE (RTM) CT bactericide/fungicide, 18.917 pounds of propylene glycol (99.8% pure; Interstate Chemical Corp., Hermitage, Pa.), 4.0 pounds of TAMOL (RTM) 850 dispersant, 2.043 pounds of tripotassium phosphate, 15.542 pounds of mineral spirits, 1.776 pounds of AP-SILANE 33 (TM) (Advanced Polymer, Inc., Carlstadt N.J.), 9.50 pounds of ACRYSOL (RTM) TT615 thickener, 87.22 pounds of water, 20.547 pounds of titanium dioxide R706 (DuPont, Wilmington, Del.), 1100 pounds of calcium carbonate having an average particle size smaller than 100 micrometers (calcium carbonate product G260, J. M. Huber Corp., Marble Hill, Ga.), and 630 pounds of calcium carbonate having an average particle size greater than 100 micrometers (calcium carbonate product 40-200, Imerys Actives Group, Roswell, Ga.) were added, and the mixture was thoroughly mixed. Thereafter, the pH was adjusted to 7.4–8.8 by addition of 4.0 pounds of ammonium hydroxide and further thorough mixing under vacuum.

When applied and dried, this grout composition exhibits greater flexibility than does the grout composition of Example 1. This grout composition is useful in traditional grout applications and in applications in which grout flexibility is important. By way of example, this grout is useful in 'floating floor' applications, in which discrete panels (e.g., panels having laminated wood or ceramic tiles thereon) are laid atop (but not adhered to) a solid substrate so that the panels interlock with one another. This grout composition can be used to fill interstices between the panels or tiles thereon. The flexibility of the grout composition accommodates minor movement, shifting, and settling that occurs in floating floor panels, without significantly splitting, cracking, or peeling away from the panels or tiles.

The disclosure of every patent, patent application, and publication cited herein is hereby incorporated herein by reference in its entirety.

While this invention has been disclosed with reference to specific embodiments, it is apparent that other embodiments and variations of this invention can be devised by others skilled in the art without departing from the true spirit and scope of the invention. The appended claims include all such embodiments and equivalent variations.

What is claimed is:

1. A grout composition comprising
   a) 20% to 40%, by weight, of first mineral filler particles having an average particle size in the range from 160 to 700 micrometers and a Mohs hardness less than 6.5;
   b) 20% to 40%, by weight, of second mineral filler particles having an average particle size in the range from 90 to 120 micrometers; and
   c) 20% to 35%, by weight, of an air-dryable polymeric latex, the latex having a solids content sufficient to form a solid grout from the composition upon drying.

2. The composition of claim 1, wherein at least 80% of the first particles have a size in the range from 160 to 700 micrometers.

3. The composition of claim 2, wherein at least 80% of the second particles have a size in the range from 90 to 120 micrometers.

4. The composition of claim 1, wherein the first mineral filler particles and the second mineral filler particles are particles of the same mineral.

5. The composition of claim 1, wherein the latex comprises a plurality of polymers.

6. The composition of claim 5, wherein the latex comprises a plurality of acrylic polymers.

7. The composition of claim 1, further comprising a polymer-soluble dye.

8. The composition of claim 1, wherein the composition comprises one or more solvents in an amount sufficient to improve the workability of the composition.

9. The composition of claim 1, further comprising a fungicide.

10. The composition of claim 1, further comprising propylene glycol in an amount sufficient to modulate the rate of drying of the composition upon exposure to air.

11. The composition of claim 1, further comprising an antifoam, a wetting agent, a biocide, a thickening agent, a drying rate modulator, and water.

12. The composition of claim 1, further comprising a water-repelling polymer.

13. The composition of claim 12, wherein the water-repelling polymer is selected from the group consisting of fluorochemical polymers, styrene maleic anhydride copolymers, and polyalkylsiloxanes.

14. The composition of claim 1, further comprising a coupling agent for covalently binding at least one of the first and second mineral fillers with a polymer of the latex.

15. A sealed container containing the grout composition of claim 1, wherein the container has a nozzle for dispensing the composition from the container under pressure.

16. The container of claim 15, further comprising a valve in fluid communication with the nozzle, whereby the composition is dispensed through the nozzle upon actuation of the valve.

17. The container of claim 15, further comprising a piston having a face that urges the composition through the nozzle upon application of force pressure to the piston.

18. The container of claim 17, further comprising a pressurized reservoir exerts pressure on the piston.

19. The container of claim 17, wherein the shape of the container is adapted to fit a caulking gun, whereby the caulking gun can be used to apply pressure to the second face of the piston and dispense the composition through the nozzle.

20. A pressurized container containing the grout composition of claim 1, wherein the container has a valved outlet in fluid communication with the interior of the container for dispensing the composition from the container under pressure upon actuation of the valve.

21. The container of claim 20, further comprising a nozzle in fluid communication with the outlet of the valve, for directing the dispensed composition.

22. The container of claim 21, wherein the nozzle has a dispensing end adapted to fit between ceramic tiles.

23. The container of claim 22, wherein the dispensing end of the nozzle is adapted to fit between ceramic tiles spaced not less than 0.5 inch apart.

24. The container of claim 22, wherein the dispensing end of the nozzle is adapted to fit between ceramic tiles spaced not less than 0.25 inch apart.

25. The container of claim 22, wherein the dispensing end of the nozzle is adapted to fit between ceramic tiles spaced not less than 0.125 inch apart.

26. The container of claim 22, wherein the dispensing end of the nozzle defines an orifice through which the composition can be dispensed and a shaping edge adjacent the orifice, whereby the surface of the dispensed composition can be shaped by sliding the shaping edge along the surface.

27. The container of claim 26, wherein the shaping edge has a rounded shape for imparting a concave shape to the surface of the dispensed composition when the shaping edge is slid along the surface.

28. The container of claim 22, wherein the nozzle comprises a stabilizing member for sliding against a tiled surface while dispensing the composition.

29. The container of claim 28, wherein the stabilizing member is unitary with the nozzle.

30. The container of claim 20, further comprising a piston interposed between a pressurized portion of the container and a second portion of the container, wherein the second portion contains the composition and fluidly communicates with the valve.

31. The container of claim 30, wherein the container has a substantially circular cross-section arid the pressurized portion of the container urges the piston axially along the container.

32. The container of claim 20, wherein the pressurized portion of the container comprises a pressurized bladder contained within the container.

33. A container having a sealed outlet and a compressible portion and containing the composition of claim 1, whereby the composition is dispensable from the outlet when the outlet is unsealed and the compressible portion is compressed.

34. The container of claim 33, wherein the outlet is sealed by a valve.

35. A method of waterproofing a surface having tiles adhered thereto, the method comprising filling interstices between the tiles with the composition of claim 1.

36. The method of claim 35, wherein the interstices are filled by applying the composition to the tiled surface, urging the composition into the interstices, and thereafter removing excess composition not contained within the interstices.

37. The method of claim 35, wherein the interstices are filled using an apparatus which comprises a container containing the composition, a pressure source, and a valve in fluid communication with the pressure source and the interior of the container for dispensing the composition from the container upon actuation of the valve.

38. The method of claim 37, wherein the apparatus further comprises a nozzle for directing the dispensed composition into the interstices.

39. The method of claim 37, wherein the apparatus is a container having a piston interposed between a pressurized portion of the container and a second portion of the container, wherein the second portion contains the composition and fluidly communicates with the valve.

* * * * *